US012373319B2

United States Patent
Isachar et al.

(10) Patent No.: US 12,373,319 B2
(45) Date of Patent: Jul. 29, 2025

(54) SYSTEMS AND METHODS FOR USAGE OF SPARE CORES IN CONNECTION WITH IN-FIELD TESTS OF OPERATIONAL CORES

(71) Applicant: Google LLC, Mountain View, CA (US)

(72) Inventors: Ori Isachar, Tel Aviv (IL); Shay Gal-On, Mountain View, CA (US); Martin Guy Dixon, Portland, OR (US)

(73) Assignee: Google LLC, Mountain View, CA (US)

( * ) Notice: Subject to any disclaimer, the term of this patent is extended or adjusted under 35 U.S.C. 154(b) by 35 days.

(21) Appl. No.: 18/116,075

(22) Filed: Mar. 1, 2023

(65) Prior Publication Data
US 2024/0296102 A1    Sep. 5, 2024

(51) Int. Cl.
*G06F 11/00* (2006.01)
*G06F 11/22* (2006.01)
*G06F 11/26* (2006.01)

(52) U.S. Cl.
CPC .......... *G06F 11/26* (2013.01); *G06F 11/2242* (2013.01)

(58) Field of Classification Search
CPC .............................. G06F 11/26; G06F 11/2242
See application file for complete search history.

(56) References Cited

U.S. PATENT DOCUMENTS

| | | | |
|---|---|---|---|
| 8,140,902 B2 * | 3/2012 | Floyd ................. | G06F 11/2242 714/30 |
| 8,856,196 B2 * | 10/2014 | Yamada ................. | G06F 9/505 708/104 |
| 9,311,202 B2 * | 4/2016 | Wang ................... | G06F 11/263 |
| 11,403,194 B2 | 8/2022 | DeHaemer et al. | |
| 12,044,720 B1 * | 7/2024 | Mao ................... | G01R 31/2834 |
| 2011/0219264 A1 | 9/2011 | Shimose | |
| 2020/0174901 A1 * | 6/2020 | Bergmann .......... | G06F 11/2236 |
| 2020/0003341 A1 | 10/2020 | Varma et al. | |

FOREIGN PATENT DOCUMENTS

| | | | | |
|---|---|---|---|---|
| CN | 105518475 B | * | 9/2019 | ....... G01R 31/31722 |
| CN | 111308329 B | * | 2/2022 | ....... G01R 31/31704 |
| CN | 109344018 B | * | 3/2022 | .......... G06F 11/2236 |

OTHER PUBLICATIONS

Extended European search report for European Appl. No. 23192783.1 dated Feb. 12, 2024. 7 pages.

\* cited by examiner

*Primary Examiner* — Amine Riad
(74) *Attorney, Agent, or Firm* — Lerner David LLP (57) ABSTRACT

The technology generally relates to systems and methods for performing in-field testing of processing cores within a system-on-chip (SoC), so as to identify faults, including those associated with silent data corruption. For example, an SoC may contain operational cores and spare cores. An operational core may be selected for testing while a spare core is used to replace the tested core. In addition, a spare core may be used to replace an operational core that has been determined to be corrupted.

20 Claims, 6 Drawing Sheets

SYSTEMS AND METHODS FOR USAGE OF SPARE CORES IN CONNECTION WITH IN-FIELD TESTS OF OPERATIONAL CORES

BACKGROUND

Many devices operate with a System on Chip ("SoC") that includes a plurality of CPU cores, and the number of cores per SoC within computing devices has continued to increase over time. During its lifetime, the SoC's cores can be subject to issues, such as silent data corruption ("SDC"), which can prevent the core, and the entire SoC, from operating properly. It is desirable to be able to identify, during the lifetime of an SoC, any latent defects, marginalities, and degradations that can lead to core failures and SDC issues. However, the testing process for these cores are currently intrusive to the system's functionality, performance, and/or efficiency.

BRIEF SUMMARY

The present disclosure addresses problems associated with monitoring and identifying defects, including those that can result in SDC, within one or more cores of a computing device. Various systems and methods disclosed herein allow for in-field testing of cores in a non-intrusive manner, so as to allow the computing device to maintain functionality during testing of the core. In particular, the systems and methods disclosed herein allow for an operational core to enter a testing mode when it is determined to be in an idle state, and a spare core is to be assigned to replace the core that is being tested. The replacement of the tested core with the spare core can be performed in a manner that allows an operating system for the device to continue to function as if the tested core was still operational.

By maintaining overall performance of the computing device during in-field testing, the computing device can be configured to perform in-field testing more often, thereby identifying core failures sooner. In addition, if an in-field test identifies a core failure, the systems and methods disclosed herein allow for a spare core to be initialized and maintained as an operational core, such that the overall system may continue operating without impacting the system's functionality, performance and efficiency. Thus, the present disclosure can be implemented in a manner that can extend an SoC's lifetime in the field.

In accordance with aspects of the disclosure, methods for operation of an SoC may include determining that a first core, from a plurality of operational cores, meets one or more criteria for an in-field test; identifying a first ID of the first core; identifying that a first spare core is available; initializing the first spare core to be in an operational mode, wherein initializing comprises assigning the first ID to the first spare core; placing the first core into a test mode; and performing the in-field test of the first core while maintaining the first spare core in the operation mode under the first ID.

In accordance with other aspects of the disclosure, the methods may further include determining, based on the in-field test, that the first core is not corrupted; designating the first core as an available spare core under a spare ID; and maintaining the first spare core as an operational core under the first ID.

In accordance with still other aspects of the disclosure, one of the criteria for the in-field test may be that the first core has not been tested for a predetermined period of time. In addition, one of the criteria for the in-field test may occur while the first core is in a low power mode, and wherein the first core is maintained in a low power mode during initialization of the spare core.

In accordance with yet other aspects of the disclosure, the methods may include determining, based on the in-field test, that the first core is corrupted, and designating the first core as an inoperable core that is not available as either an operational core or as spare core. In addition, the method may include determining that no additional spare cores are available in connection with the plurality of operational cores, and altering one or more testing procedures for the plurality of cores based on determining that no additional spare cores are available.

In accordance with other aspects of the disclosure, the methods may include determining, while the first core is in the test mode, that a second core, from the plurality of operational cores, meets one or more criteria for the in-field test; identifying a second ID of the second core; identifying that a second spare core is available; initializing the second spare core to be in an operational mode, wherein initializing comprises assigning the second ID to the second spare core; placing the second core into a test mode; and performing the in-field test of the second core while maintaining the second spare core in the operation mode under the first ID.

In accordance with still other aspects of the disclosure, a system may include an SoC having one or more controllers and a plurality of operational cores, wherein the one or more controllers are configured to: determine that a first core, from the plurality of operational cores, meets one or more criteria for an in-field test; identify a first ID of the first core; identify that a first spare core is available; initialize the first spare core to be in an operational mode, wherein initializing comprises assigning the first ID to the first spare core; place the first core into a test mode; and perform the in-field test of the first core while maintaining the first spare core in the operation mode under the first ID.

In accordance with other aspects of the disclosure, the one or more controllers may be further configured to determine, based on the in-field test, that the first core is not corrupted; designate the first core as an available spare core under a spare ID; and maintain the first spare core as an operational core under the first ID. In addition, the criteria for the in-field test may be that the first core has not been tested for a predetermined period of time. One of the criteria for the in-field test may occur while the first core is in a low power mode, and wherein the first core is maintained in a low power mode during initialization of the spare core.

In accordance with still other aspects of the disclosure, the one or more controllers may be further configured to determine, based on the in-field test, that the first core is corrupted, and designate the first core as an inoperable core that is not available as either an operational core or as spare core. The one or more controllers may also be further configured to determine that no additional spare cores are available in connection with the plurality of operational cores, and alter one or more testing procedures for the plurality of cores based on determining that no additional spare cores are available.

In accordance with yet other aspects of the disclosure, the one or more controllers may be further configured to: determine, while the first core is in the test mode, that a second core, from the plurality of operational cores, meets one or more criteria for the in-field test; identify a second ID of the second core; identify that a second spare core is available; initialize the second spare core to be in an operational mode, wherein initializing comprises assigning the second ID to the second spare core; place the second core into a test mode; and perform the in-field test of the second core while maintaining the second spare core in the operation mode under the first ID. A similar process may also be performed in connection with a third core, a fourth core, and so on, in accordance with aspects of the disclosure.

In accordance with yet other aspects of the disclosure, the systems and methods may include identifying one or more criteria within an SoC for an in-field test of at least one of a plurality of operational cores within the SoC, wherein each of the plurality of operational cores has a corresponding core ID and wherein the SoC contains one or more spare cores; performing the in-field test for at least one of the plurality of operational cores within an SoC; determining, based on the in-field test, that a first core from the plurality of cores is corrupted; designating the first core as an inoperable core; and maintaining a first spare core, from the one or more the spare cores, as operational under the core ID corresponding to the first core.

In accordance with still other aspects of the disclosure, the one or more criteria may include the SoC entering into a boot-time power-up. In addition, the plurality of operational cores may be contained on a chiplet of the SoC, and the in-field test may include testing each of the operational cores contained on the chiplet.

In accordance with yet other aspects of the disclosure, the in-field test is an online in-field test of the first core, and the method may further comprise assigning the first spare core with the core ID corresponding to the first core prior to performing the online in-field test of the first core. In addition, the systems and methods may include determining that, after the first spare core is maintained as operational, the SoC does not contain additional spare cores; and transmitting a notification that SoC does not contain additional spare cores. In addition, the one or more criteria may be either static or variable over time.

DETAILED DESCRIPTION

The present disclosure provides for in-field testing of SoC cores in order to identify faults, such as SDC, and provides for maintaining operation of an SoC in the event a core is identified as being corrupted. If any one of the cores are corrupted, the SoC can fail or can experience limited functionality and performance. Thus, it is beneficial to identify and remove corrupted cores from the system. However, the testing and replacement of corrupted cores can itself impact production traffic within the computing system, and can reduce the system's functionality, performance, and/or efficiency.

The disclosed systems and methods allow for spare cores to be implemented as part of the in-field testing process and to be used in connection with replacing cores that have suffered a fault. For example, an SoC for a computing system may include one or more chiplets, with each chiplet containing a plurality of processing cores that are available for the system to be used for functional purposes. These processing cores can include one or more spare cores, which are functional, but which are not identified for use by the operating system. The cores that are identified for use by the operating system may be referred to as operational cores, which can be enumerated during initialization of the system so that each operational core has a unique identifier or logical ID by which it is seen and addressed by the operating system during normal operations.

The disclosed system may be configured so that the operational cores are each placed into a test mode, during which an in-field test is performed to determine if the core is corrupted. The system may determine when a particular core is in a state for which an in-field test can be conducted. For example, during operation of the SoC, the operational cores may be in an active state or an idle state. A core is in an active state when it is currently performing one or more operations for the operating system, while a core is in an idle state when it is not currently performing any operations. A core that is in an idle state can go into a low-power mode, and the SoC can be configured to determine that a particular core is in a low-power mode, or is otherwise in an idle state, whereupon the core is placed into a test mode. While in the test mode, the core can be tested to identify whether it has been subjected to any SDC.

As part of the process for placing a core into a test mode, the system may be configured to initialize a spare core, which will be used to replace the original core that is being tested. This replacement can be performed in a manner that allows the system to function without having to alter the manner in which cores are viewed and called by the operating system. For example, the original core has a particular logical ID, which the operating system uses to identify that core. In accordance with the current disclosure, the original core can be held in a low power mode, and the spare core can be woken or otherwise initialized to be an operational core. As part of the initialization, the spare care can be assigned with the logical ID of the original core so that when the operating system sends a request in accordance with that logical ID, the SoC will present the spare core, rather than the original core. The testing of the original core can therefore proceed in a manner that is transparent to the operating system, in that the operating system does not need to be notified or otherwise aware that the request using the particular logical ID is now being performed by a different physical core. Thus, testing of a core may be performed while the SoC is online without losing functionality, performance, or efficiency.

Figure 1:
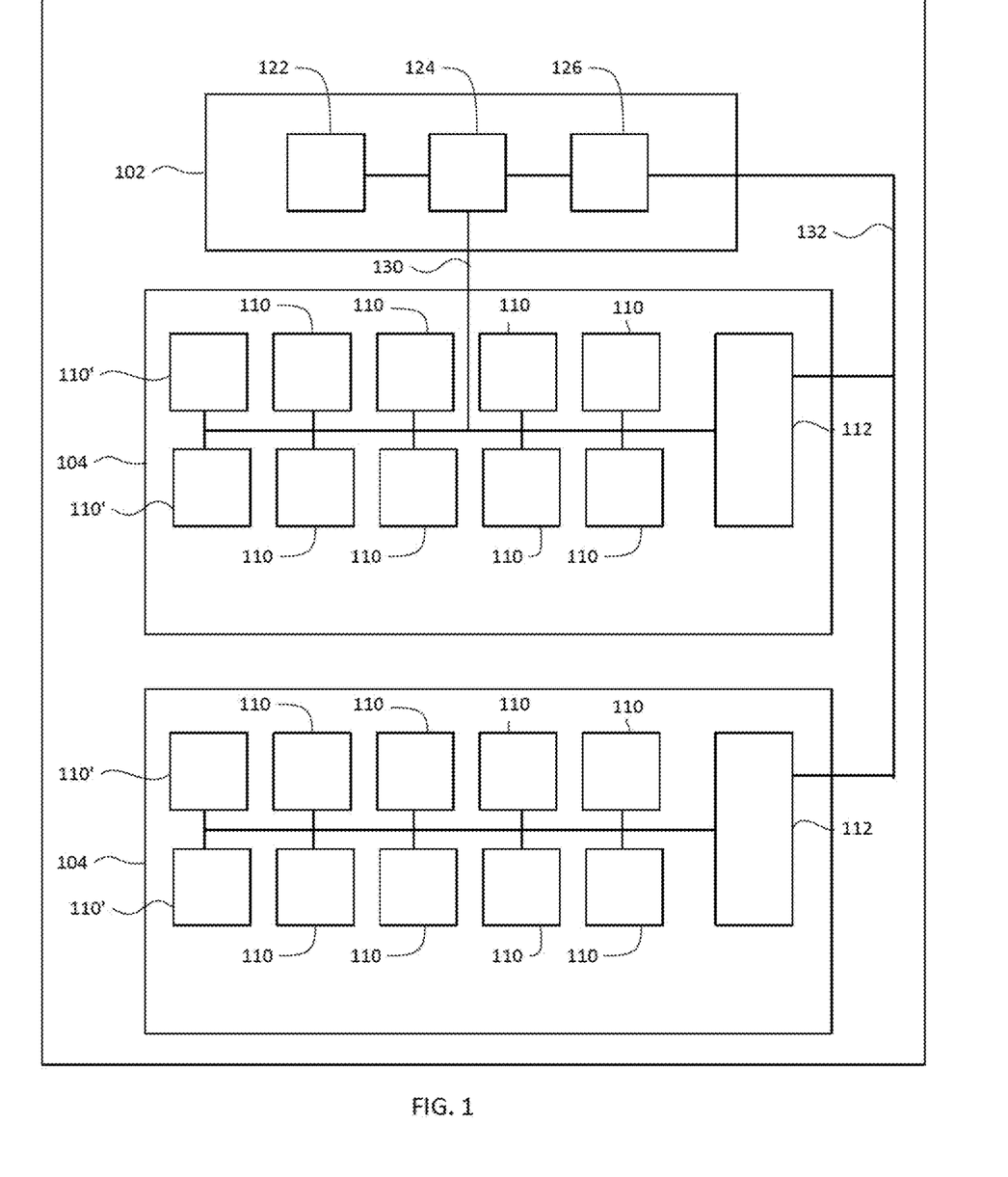
FIG. 1 is a block diagram of an example system in accordance with aspects of the disclosure.

The systems and methods of the disclosure may be used with any SoC having one or more spare cores that can be used to replace an operational core being tested or to replace a core that has been determined to be corrupted. The systems and methods may include SoCs that contain a plurality of chiplets configured to perform operations for a system or device, and in which the chiplets of the SoC are provided requests and commands by an operating system. For example, FIG. 1 is a diagram of an SoC 100 that includes an control chiplet 102 as well as a plurality of computing chiplets 104. Control chiplet 102 may have a controller processor 126 with a memory system architecture, including a local SRAM 122. Control chiplet 102 may also contain fabric 124 that is configured to connect with computing chiplets 104 via interconnect 130. Control chiplet 102 may be configured to control particular operations of the chiplets 102, including controlling at least part of the process by which the cores 110 of chiplets 104 are tested. Each chiplet 104 contains a plurality of operational cores 110 and may also contain one or more spare cores 110'. Each computing chiplet 104 may also have a controller 112, which can be connected to controller processor 126 of control chiplet 102 via interconnect 132.

The cores 110 and 110' may send and receive transmissions between chiplets via interconnect 130 as D2D communications, with additional interconnects serving as general-purpose input/outputs. Cores 110 and 110' of a chiplet 104 may also send and receive transmissions between controller 112 of the chiplet 104. Cores 110 may be designated by control chiplet 102 as operational cores, so that they are available for performing operations on behalf of an operating system (not shown) for SoC 100. Cores 110' may be designated by control chiplet 102 as spare cores, so that they are not available to the operating system for SoC 100. Thus, cores 110' may be designated within the SoC in a manner that prevents them from being exposed to the operating system. However, as disclosed herein, a spare core 110' may be redesignated to have a logical ID that corresponds to one of the operational cores 110, at which point the spare core 110' will appear to the operating system as an operational core.

Chiplets 102 and 104 of SoC 100 may contain additional components and connections that are a part of a standard SoC, including specialized hardware, software, or firmware that is needed for performing particular operations.

Figure 2:
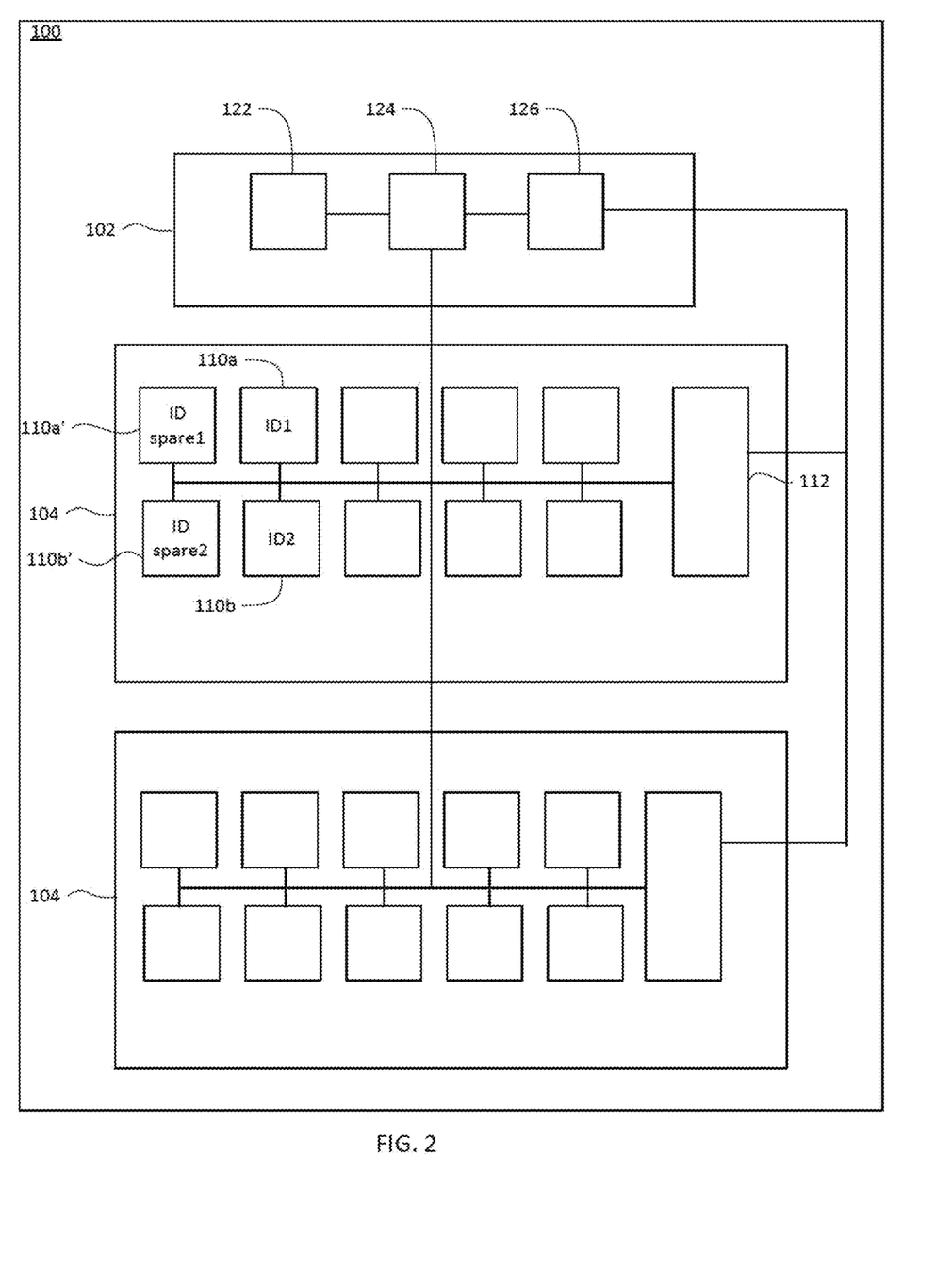
FIG. 2 is a block diagram of an example system including operational and spare cores in accordance with aspects of the disclosure.

FIG. 2 is a block diagram of SoC 100 having a computing chiplet 104 with an operational core 110a is assigned a logical ID of <ID1>, while operational core 110b is assigned a logical ID of <ID2>. In addition, computing chiplet 104 has two spare cores 110a' and 110b', which are designated with logical IDs <IDspare1> and <IDspare2>, respectively. The assigned logical IDs with the core designations, may be maintained at control chiplet 102, or in another component that is accessible to an SoC controller for computing chiplet 104. By being assigned operational logical IDs, cores 110a and 110b can be made available to an operating system of SoC 100, so as to perform desired operations. For example, an operating system may provide requests and commands to SoC 100 using logical IDs <ID1> and <ID2>, which can be transmitted to chiplet 104, and where upon cores 110a and 110b will perform the transmitted request or command.

During normal operation of computing chiplet 104, operational cores 110a and 110b will transition between an active state and an idle state, and components of SoC 100, such as control chiplet 102 may be configured to monitor whether operational cores are currently in an active or idle state. In addition, operational cores 110, including cores 110a and 110b, can be monitored to determine whether a particular core should be tested to determine if the core has suffered from some fault. The testing of a core may include a core scan, or other testing method, that is capable of identifying SDC, or similar faults, within the core. The testing process may be performed using hardware, software, firmware, or some combination thereof. For example, control chiplet 102 may be configured to control the testing process for the cores 110 of computing chiplets 104.

During operation of chiplet 104, it may be determined by control chiplet 102 that operational core 110a has entered into an idle state, as it is not currently performing any operations. This idle state may be accompanied by core 110a entering into a low power mode. Either prior to or subsequent to core 110a entering the idle state, control chiplet 102 may also determine whether core 110a is a candidate for testing.

The determination of whether a core 110 should be tested for a potential fault can be based on one or more predetermined criteria in connection with the core 110 or in connection with the chiplet 104. Soc 100 may be configured so that all operational cores 110 are tested for a potential fault in accordance with a predetermined schedule. This schedule may be static or variable, depending on usage of SoC 100. For example, SoC 100 may be configured so that each core 110 within SoC 100 is tested once a day, or once an hour, for SDC or similar faults. In accordance with this criterion, control chiplet 102 may maintain a log of tests that have been performed for each core 110, and may determine whether a particular core has not been tested, for example, in the last 24 hours. For example, control chiplet 102 may determine that core 110a meets one or more testing criteria, as core 110a has not been tested in the last 24 hours, and control chiplet 102 may also determine that core 110a is in an idle state, wherein it has entered a low-power mode. Based on this determination, chiplet 102 may submit a request for core 110a to enter a test mode.

As part of core 110a entering into a test mode, it may be determined that core 110a' is a currently available spare core, which can be used to replace core 110a, as it is being tested. This replacement may be achieved by the logical ID<ID1> of core 110a being assigned to core 110a', so that any command or request that is sent using <ID1> will be directed to core 110a', instead of core 110a.

Figure 3:
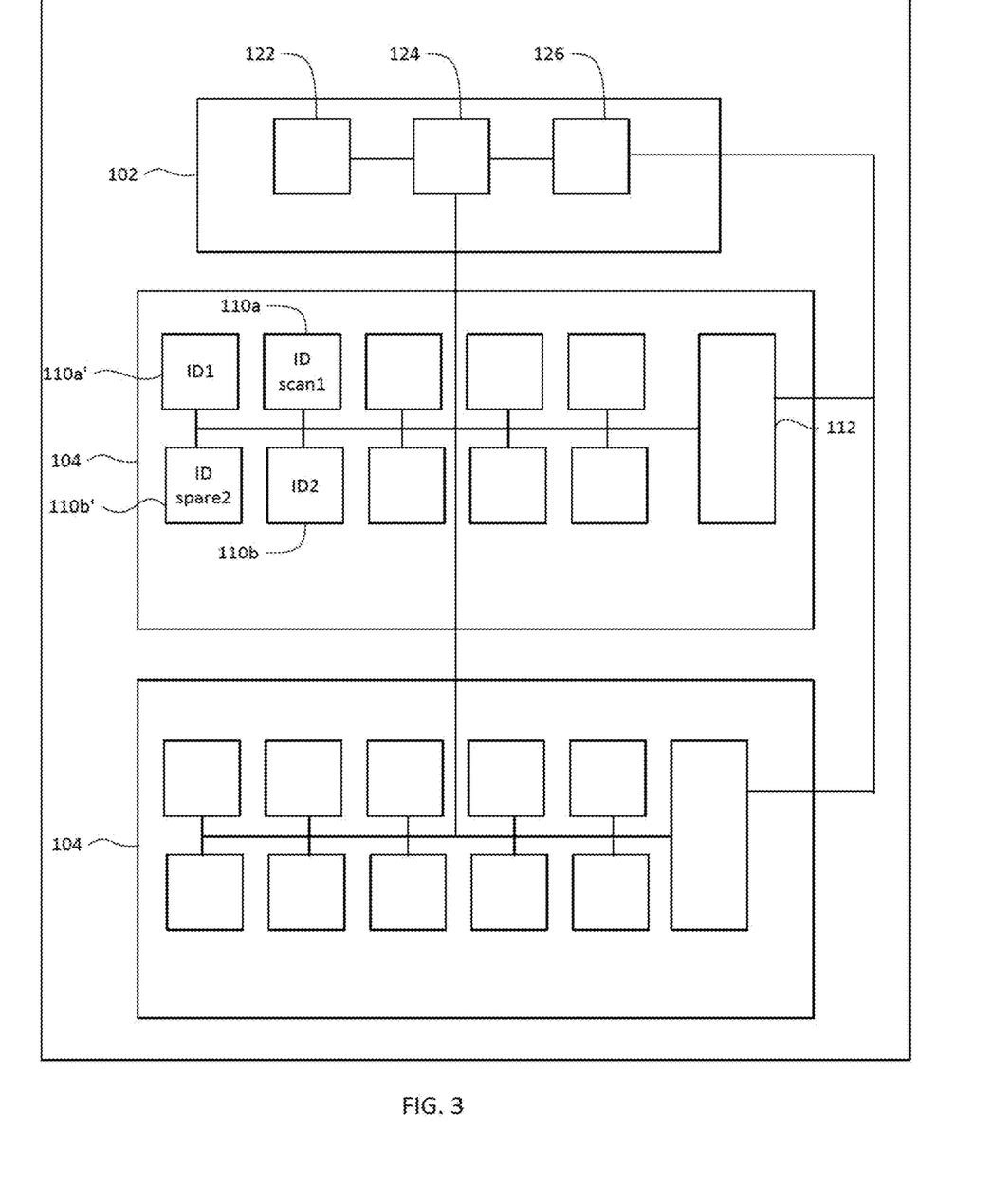
FIG. 3 is a block diagram of an example system in which a spare core has replaced an operational core in accordance with aspects of the disclosure.

FIG. 3 is a block diagram of SoC 100 in which it is shown that core 110a' has been assigned the logical ID of <ID1>, while core 110a has been assigned a logical ID of <IDscan1>. One or more tests may be performed on core 110a, as it is tested for potential faults in accordance with being in a test mode. While these tests of core 110a are being performed, core 110a' may be in an operational mode under the logical ID of <ID1>.

If core 110a is not found to contain any fault, the test is determined a success, and core 110a may be taken out of test mode and made available for use. For example, core 110a may be taken out of test mode and designated as an available spare core. This may be achieved by chiplet 102 assigning core 110a with a logical ID of <IDspare1>, which is designated as being an ID for an available spare core. In accordance with one example, the logical ID of <IDscan1> and <IDspare1> may be identical to one another, the only difference being that the chiplet 102 designates the logical ID as being associated with a test mode while the test is being performed and designates the logical ID as being associated with an available spare core once the test has been successfully completed.

While core 110a is in the process of being tested, control chiplet 102 may determine that core 110b, having a logical ID of <ID2>, meets the criteria for being tested. Based on this determination, chiplet 102 may determine that core 110b' is currently designated as an available spare core, and may then place core 110b into a test mode, while having core 110b' replace core 110b as an operational core. In replacing core 110b, the logical ID of core 110b' is changed to <ID2>.

Figure 4:
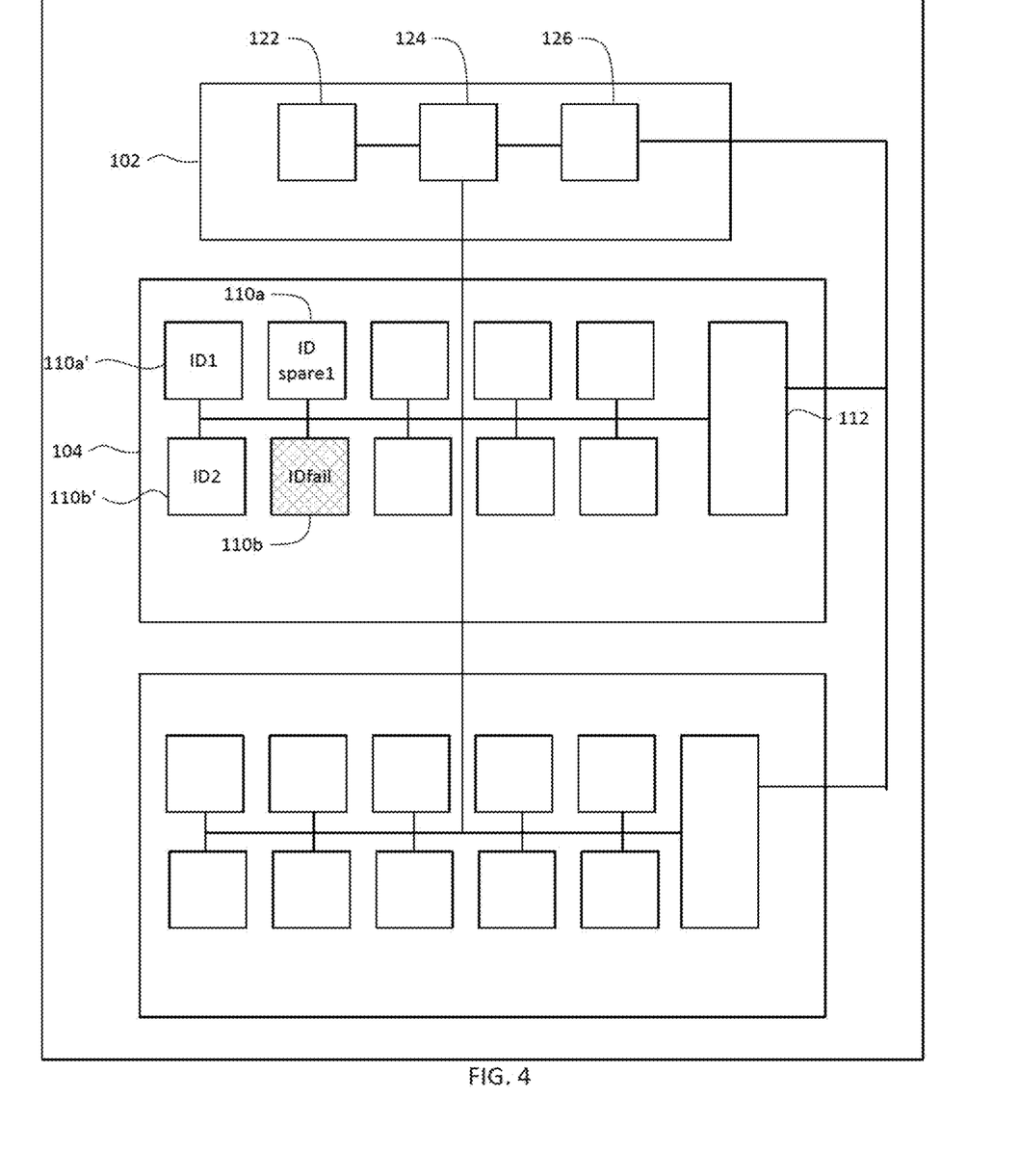
FIG. 4 is a block diagram of an example system in which a core has been designated as inoperable in accordance with aspects of the disclosure.

In performing a test of core 110b, it may be determined that core 110b has been corrupted. In this instance, control chiplet 102 may designate core 110b as an inoperable core. FIG. 4 is a block diagram of SoC 100 in which core 110b is designated as an inoperable core. As part of the inoperable designation, chiplet 102 may assign core 110b with a logical ID of <IDfail>, which identifies core 110b as being unavailable as either an operational core or as a spare core. Accordingly, chiplet 104 of FIG. 4 has gone from having two available spare cores to having only one available spare core 110a to perform future tests.

In accordance with aspects of the disclosure, SoC 100 may consecutively test each of the cores 110 of a computing chiplet 104 using a single spare core by cycling through each operational core and replacing the logical ID of the spare core with the logical ID of the core that is currently being tested. This process can continue until the number of cores 110 that have experienced failure causes the SoC to have no remaining spares available. Upon determining that no remaining spares are available, SoC 102 may notify a cluster manager, or some external device from SoC 100, that chiplet 104 has no more spare cores available. An SoC 100 that has no remaining spare cores may be designated for replacement within the overall system, as online in-field testing of SoC 100 will now cause a reduction in the number of available operational cores 110. If any additional operational core 110 is identified as being corrupted, the entire SoC 100 may be designated as being inoperable. In addition, an SoC 100 with no available spare cores 110 may also be designated for boot-time in-field testing only, in which all of the cores of the SoC 100 are simultaneously tested at the time the SoC 100 is powered up during a boot process. An example of a boot-time in-field testing process is discussed below in connection with FIG. 6.

In accordance with aspects of the disclosure, the criteria for placing one or more cores 110 into a testing mode may be static or variable. For example, a time variable criterion may be used to determine whether a particular core 110 should be tested. This time variable criterion may identify cyclical time periods over which a large number of the operational cores 110 of the computing chiplets 104 are in an idle state or in an active state. Control chiplet 102 may be configured so that criteria for testing are changed depending on whether a chiplet 104 is in a relatively active period of time or is in a relatively inactive period of time.

Figure 5:
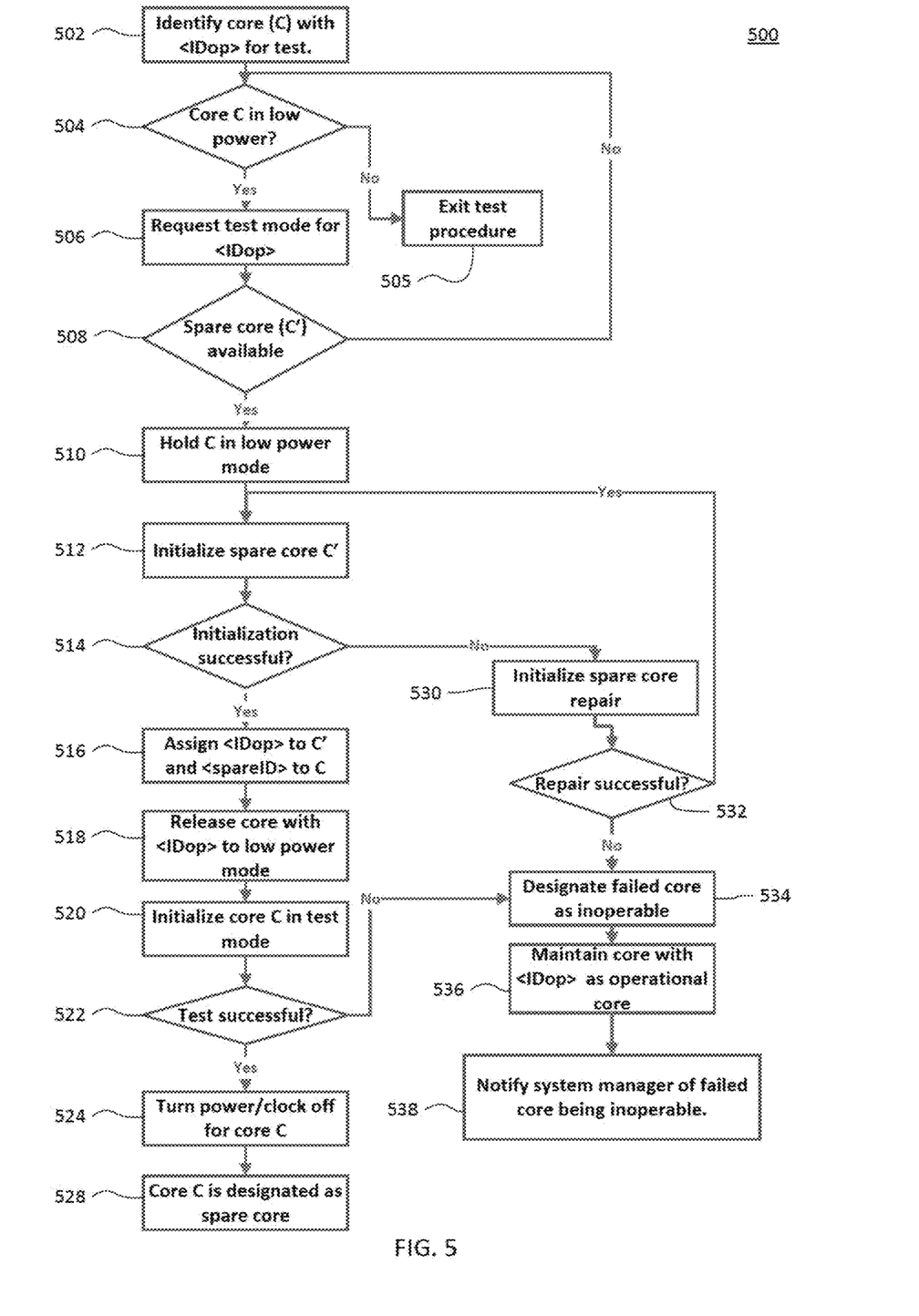
FIG. 5 is a flow diagram of an example method for online in-field tests of SoC cores in accordance with aspects of the disclosure.

FIG. 5 is a flow diagram 500 of an example process for testing an operational core (C) that is part of an SoC that is in the field and online. In accordance with block 502, an operational core (C) having a logical ID of <IDop> can be identified as being a candidate for a test based on one or more predetermined criteria. For example, it may be determined that core C has not been tested for SDC in the last day and that core C is currently in an idle state. In identifying operational core C as being prepared to enter a testing mode, it may be determined that operational core C is in a low power mode, in accordance with block 504. This low power mode may be initiated automatically by operational core C upon entering an idle state, or operational core C may be put into a low power mode by the SoC as part of preparing core C for a testing mode. If core C is in low power mode or can be placed into low power mode from an idle state, a request can be made for operational core C to be placed into a testing mode, in accordance with block 506. This request can be made based on the logical ID of operational core C.

In accordance with block 508, it is determined whether a spare core is available to be initiated as part of the testing of operational core C. If a spare core is not currently available, the system can wait until a spare core becomes available. In waiting for a spare core additional determinations can be made that operational core C is still in a low power mode, in accordance with block 504. For example, if no spare core is determined to be available, the operational core C may need to perform one or more operations for the SoC, and the operational core C will transition out of the low power mode and enter into an active state so that it can perform the one or more operations. If Core C has become active, so that it is no longer in a low power mode, the test procedure for core C may be stopped in accordance with block 505. Accordingly, the system can be configured so that a testing process for operational core C will not commence until an operational core C and a spare core are both in a condition that is conducive for conducting the test.

If a spare core C' is determined to be available, operational core C can be held in a low power mode, in accordance with block 510, and spare core C' can be initialized, in accordance with block 512. Initialization of spare core C' can include waking up spare core C' from a low power mode, or from an otherwise idle state. The spare core C' can be determined to be initialized successfully if it is found that spare core C' has stable power and clock signals and is otherwise in a condition to operate as an operational core.

If it is determined that spare core C' has not been initialized successfully, a spare core repair procedure may be initialized, in accordance with block 530. This repair procedure may include providing spare core C' with one or more additional commands or requests, which can be used to properly initialize spare core C'. If the repair procedure is successful (block 532), the number of initialization attempts can be incremented by one, and the initialization of spare core C' in accordance with block 512 may resume. If the repair procedure is not successful (block 532), the failed core can be designated as an inoperable core, in accordance with block 534. As part of block 532, the system can determine whether the initialization has failed for some predetermined threshold of attempts. This threshold may be configurable. If the initialization has failed for more than some threshold of attempts, the spare core C' can be designated as inoperable in accordance with block 534. The core with the logical ID of <IDop> can be maintained as an operational core, in accordance with block 536. The SoC may also notify a manager of the core failure and that the core has been designated as inoperable. A core designated as inoperable is no longer available as either an operational core or as an available spare core, unless it is otherwise repaired.

If the initialization of spare core C' is determined to be successful in accordance with block 514, the SoC can assign core C with a new logical ID of <spareID>, and it can assign the spare core C' with the logical ID of <IDop> (block 516). In accordance with block 518, the spare core C' can be released into a low power mode so that it can act as an operational core under the logical ID of <IDop>. In accordance with block 520, core C can be initialized within the testing mode under the logical ID<spareID>, whereupon core C can be tested for corruption. The testing of core C can be performed by one or more components of the SoC and can include one or more known forms of HW testing methods, such as the use of design-for-testability ("DFT") infrastructure to inject scan patterns to the core or cores. Memory built-in-self-testing ("MBIST") and/or Logic built-in-self-testing ("LBIST") architecture may also be used to test the memories of a core. In addition, the test may be software-based, in that exhaustive code running on the core can be used to exercise as much logic as possible in the core, with a pass/fail criteria. For example, a collection of calculations can be performed, with the end result of the calculations may be compared with an expected value, and a mismatch in the comparison can be used to identify a potential corruption in the core.

In accordance with block 522, a determination can be made whether core C has successfully completed the one or more tests, which includes a determination that core C has not been corrupted. If the core C does not successfully complete the one or more tests, then core C can be designated as an inoperable core in accordance with block 534. The spare C', which currently is assigned the logical ID of <IDop> can then be maintained as an operational core, in accordance with block 536. The SoC may also notify a manager, such as a SoC cluster manager, that core C has failed and has been designated as inoperable, so that it will no longer be available as either an operational core or as an available spare core.

If core C has successfully completed the one or more tests, the power and clock for core C can be turned off (block 524), and core C can be designated as a spare core (block 528). The designation of core C as a spare core can include core C being designated with a particular logical ID associated with spare cores. Thus, core C may exit the testing mode as a spare core that is available to replace other operational cores that are subsequently identified for testing, and the flow diagram 500 may be repeated for a second core C, with the spare core C' corresponding to the original core C from the previous testing procedure.

Figure 6:
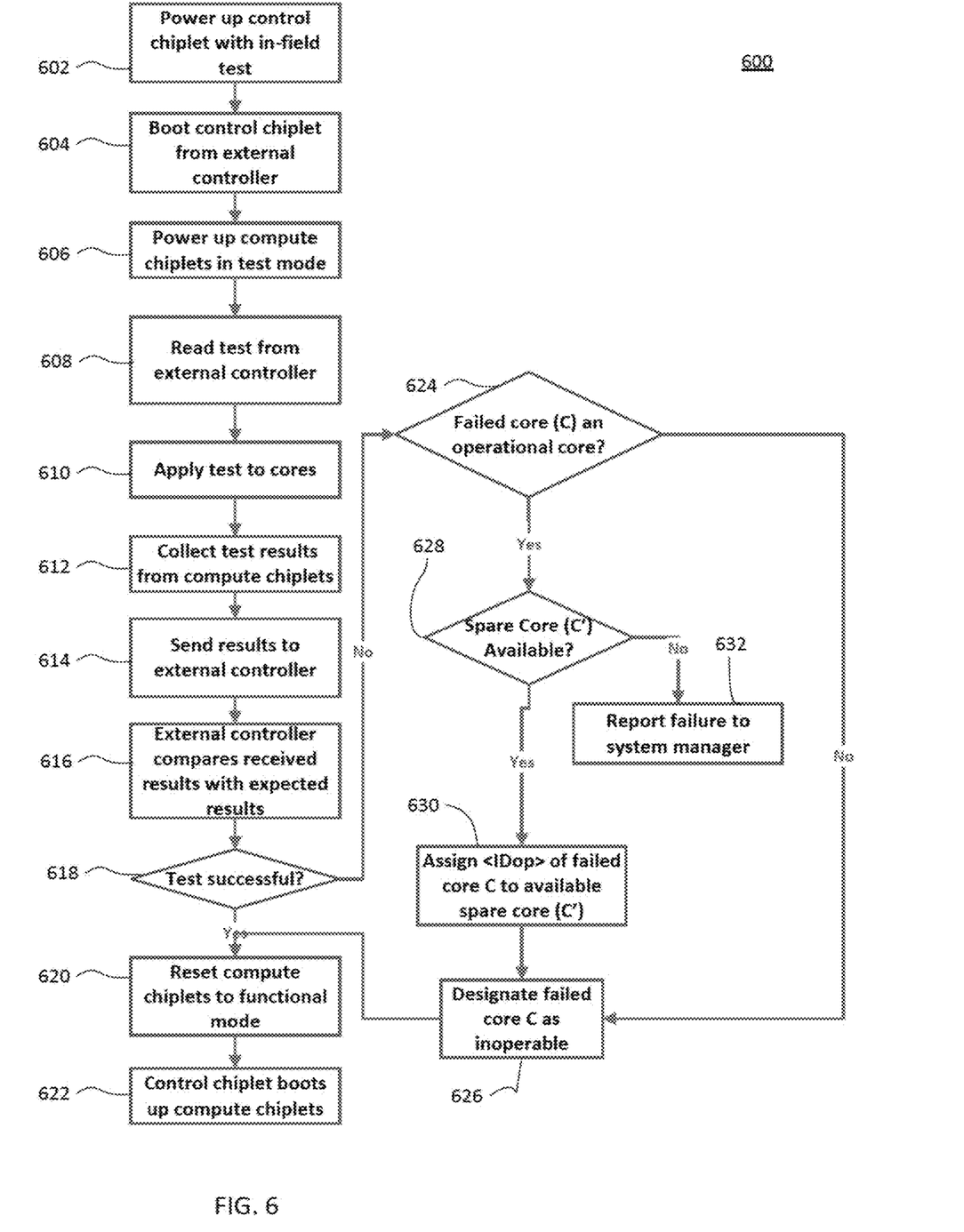
FIG. 6 is a flow diagram of an example method for boot-time in-field testing of SoC cores in accordance with aspects of the disclosure.

FIG. 6 is a flow diagram 600 of an example process for a boot-time in-field testing of cores in accordance with aspects of the disclosure. A boot-time in-field test may be performed when the system of the SoC is in a process of rebooting, such as when a kernel update is being performed. In accordance with aspects of the disclosure, a full chip test may be performed for all of the cores within the chip or chiplet. By performing a boot-time test, the SoC may be configured so that it forgoes individual core tests for some predesignated period of time. In accordance with block 602, the control chiplet can be powered up so that it asserts an in-field test as part of a reboot. This in-field test may be asserted by the control chiplet as a strap. In accordance with block 604, the control chiplet can boot from an external controller, and one or more computing chiplets can be powered up in a test mode, in accordance with block 606.

A test can be provided to the SoC from the external controller in accordance with block 608, and the test is applied to the cores of the SoC in accordance with block 610. If the test includes the application of a scan pattern, block 608 may include reading the scan pattern which can be applied to the one or more computing chiplets in accordance with block 610. In accordance with block 612, a result of the test can be obtained, and in accordance with block 614, the result can be transmitted to the external controller. For example, a read-out of an applied scan pattern can be made (block 612), and the read-out can be sent to the external controller (block 614). In accordance with block 616, the external controller can be configured to compare the received test results with expected results. For example, read-out scan results can be compared with expected results. If the test results for each computing chiplet correspond with the expected results, the test can be determined to be successful in accordance with block 618. The one or more computing chiplets can be reset to be in a functional mode in accordance with block 620, and the control chiplet can boot up the computing chiplets for normal operation in accordance with block 622.

If the test for one or more of the chiplets does not correspond with what was expected (block 618), a determination can be made as to what core within the chiplet has failed, and whether the failed core (C) is an operational core (block 624). If the failed core C is a spare core, rather than an operational core, then the failed core can be designated as inoperable, and the computing chiplet can be reset to a functional mode in accordance with block 620. However, if the failed core C is an operational core, a determination can be made by the control chiplet whether a spare core (C') is available on the computing chiplet (block 628). If a spare core is available, the SoC can assign the spare core (C') with the logical ID<IDop> of the failed core C, in accordance with block 630. The failed core C can be designated as inoperable (block 626), and the computing chiplet can be reset to a functional mode in accordance with block 620. However, if no spare cores are determined to be available in accordance with block 628, then the chiplet is in a failure state, and the failure can be reported to a system manager for the SoC (block 632).

It should be understood that the order of steps or order for performing certain actions described herein is immaterial so long as the present teachings remain operable. For example, for flow diagram 600, the actions associated with blocks 624-632 may occur after blocks 620 and 622. Moreover, two or more steps or actions may be conducted simultaneously.

Although the subject matter herein has been described with reference to particular examples, it is to be understood that these examples are merely illustrative. It is therefore to be understood that numerous modifications may be made to the illustrative examples and that other arrangements may be devised without departing from the spirit and scope of the subject matter as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A method comprising:
   determining that a first core, from a plurality of operational cores, meets one or more criteria for an in-field test;
   identifying a first ID of the first core that identifies the first core to an operating system;
   identifying that a first spare core is available;
   initializing the first spare core to be in an operational mode, wherein initializing comprises assigning the first ID to the first spare core;
   placing the first core into a test mode; and
   performing the in-field test of the first core in a manner that is transparent to the operating system while maintaining the first spare core in the operation mode under the first ID.

2. The method of claim 1, further comprising:
   determining, based on the in-field test, that the first core is not corrupted;

designating the first core as an available spare core under a spare ID; and
maintaining the first spare core as an operational core under the first ID.

3. The method of claim 1, wherein one of the criteria for the in-field test is that the first core has not been tested for a predetermined period of time.

4. The method of claim 1, wherein one of the criteria for the in-field test occurs while the first core is in a low power mode, and wherein the first core is maintained in a low power mode during initialization of the spare core.

5. The method of claim 1, further comprising:
determining, based on the in-field test, that the first core is corrupted; and
designating the first core as an inoperable core that is not available as either an operational core or as spare core.

6. The method of claim 5, further comprising:
determining that no additional spare cores are available in connection with the plurality of operational cores; and
altering one or more testing procedures for the plurality of cores based on determining that no additional spare cores are available.

7. The method of claim 1, further comprising:
while the first core is in the test mode, determining that a second core, from the plurality of operational cores, meets one or more criteria for the in-field test;
identifying a second ID of the second core;
identifying that a second spare core is available;
initializing the second spare core to be in an operational mode, wherein initializing comprises assigning the second ID to the second spare core;
placing the second core into a test mode; and
performing the in-field test of the second core in a manner that is transparent to the operating system while maintaining the second spare core in the operation mode under the first ID.

8. A system comprising:
an SoC having one or more controllers and a plurality of operational cores, wherein the one or more controllers are configured to:
determine that a first core, from the plurality of operational cores, meets one or more criteria for an in-field test;
identify a first ID of the first core that identifies the first core to an operating system;
identify that a first spare core is available;
initialize the first spare core to be in an operational mode, wherein initializing comprises assigning the first ID to the first spare and performing all hardware operations to enable the first spare core to enter operation mode;
place the first core into a test mode; and
perform the in-field test of the first core in a manner that is transparent to the operating system while maintaining the first spare core in the operation mode under the first ID.

9. The system of claim 8, wherein the one or more controllers are further configured to:
determine, based on the in-field test, that the first core is not corrupted;
designate the first core as an available spare core under a spare ID; and
maintain the first spare core as an operational core under the first ID.

10. The system of claim 8, wherein one of the criteria for the in-field test is that the first core has not been tested for a predetermined period of time.

11. The system of claim 8, wherein one of the criteria for the in-field test occurs while the first core is in a low power mode, and wherein the first core is maintained in a low power mode during initialization of the spare core.

12. The system of claim 8, wherein the one or more controllers are further configured to:
determine, based on the in-field test, that the first core is corrupted; and
designate the first core as an inoperable core that is not available as either an operational core or as spare core.

13. The system of claim 12, wherein the one or more controllers are further configured to:
determine that no additional spare cores are available in connection with the plurality of operational cores; and
alter one or more testing procedures for the plurality of cores based on determining that no additional spare cores are available.

14. The system of claim 8, wherein the one or more controllers are further configured to:
determine, while the first core is in the test mode, that a second core, from the plurality of operational cores, meets one or more criteria for the in-field test;
identify a second ID of the second core;
identify that a second spare core is available;
initialize the second spare core to be in an operational mode, wherein initializing comprises assigning the second ID to the second spare;
place the second core into a test mode; and
perform the in-field test of the second core in a manner that is transparent to the operating system while maintaining the second spare core in the operation mode under the first ID.

15. A method comprising:
identifying one or more criteria within an SoC for an in-field test of at least one of a plurality of operational cores within the SoC, wherein each of the plurality of operational cores has a corresponding that identifies the operational core to an operating system and wherein the SoC contains one or more spare cores;
performing the in-field test for at least one of the plurality of operational cores within an SoC in a manner that is transparent to the operating system;
determining, based on the in-field test, that a first core from the plurality of cores is corrupted;
designating the first core as an inoperable core; and
maintaining a first spare core, from the one or more spare cores, as operational under the core ID corresponding to the first core.

16. The method of claim 15, wherein the one or more criteria comprises the SoC entering into a boot-time power-up.

17. The method of claim 15, wherein the plurality of operational cores are contained on a chiplet of the SoC, and wherein the in-field test comprises testing each of the operational cores contained on the chiplet.

18. The method of claim 15, wherein the in-field test is an online in-field test of the first core, and wherein the method further comprises assigning the first spare core with the core ID corresponding to the first core prior to performing the online in-field test of the first core.

19. The method of claim 15, further comprising:
determining that, after the first spare core is maintained as operational, the SoC does not contain additional spare cores; and
transmitting a notification that SoC does not contain additional spare cores.

20. The method of claim 15, wherein the one or more criteria are variable over time.

\* \* \* \* \*